United States Patent [19]

Nakazono et al.

[11] Patent Number: 5,601,493
[45] Date of Patent: Feb. 11, 1997

[54] DRIVE SHAFT MADE OF FIBER REINFORCED PLASTICS, AND METHOD FOR CONNECTING PIPE MADE OF FIRE-REINFORCED PLASTICS

[75] Inventors: Akiko Nakazono; Yoshifumi Nakano; Kohji Yamatsuta; Yasuo Shinohara; Hitoshi Murotani, all of Ibaraki, Japan

[73] Assignee: Sumitomo Chemical Company Limited, Osaka, Japan

[21] Appl. No.: 139,648

[22] Filed: Oct. 22, 1993

[30] Foreign Application Priority Data

Oct. 22, 1992 [JP] Japan ................... 4-284229

[51] Int. Cl.6 ......................................... F16C 3/00
[52] U.S. Cl. ................ 464/181; 29/469.5; 29/525; 464/182
[58] Field of Search ................... 464/181, 182, 464/183; 29/469.5, 525

[56] References Cited

U.S. PATENT DOCUMENTS

| | | | |
|---|---|---|---|
| 2,001,167 | 5/1935 | Swennes | 464/181 X |
| 4,552,544 | 11/1985 | Beckman et al. | 464/181 |
| 5,222,915 | 6/1993 | Petrzelka et al. | 464/181 |
| 5,230,661 | 7/1993 | Schreiber et al. | 464/181 |
| 5,309,620 | 5/1994 | Shinohara et al. | 464/181 X |
| 5,320,579 | 6/1994 | Hoffmann | 464/181 |
| 5,342,464 | 8/1994 | McIntire et al. | 464/182 X |
| 5,348,210 | 9/1994 | Linzell | 29/525 |

FOREIGN PATENT DOCUMENTS

| | | |
|---|---|---|
| 53-9378 U | 1/1978 | Japan . |
| 54-97541 U | 7/1979 | Japan . |
| 54-132039 | 10/1979 | Japan . |
| 55-159311 | 12/1980 | Japan . |
| 62-53373 | 11/1987 | Japan . |

Primary Examiner—Michael R. Mansen
Assistant Examiner—Eileen A. Dunn
Attorney, Agent, or Firm—Sughrue, Mion, Zinn, Macpeak & Seas

[57] ABSTRACT

A drive shaft made of fiber-reinforced plastics comprising a pipe made of fiber-reinforced plastics to which a fitting is connected, in which a connecting portion of the pipe and a connecting portion of the fitting engage each other through bite of serrations formed on the inner or outer surface of the connecting portion of the fitting into the connecting portion of the pipe, with the space between the pipe and the fitting at the biting sites being filled with an adhesive.

11 Claims, 3 Drawing Sheets

DRIVE SHAFT MADE OF FIBER REINFORCED PLASTICS, AND METHOD FOR CONNECTING PIPE MADE OF FIRE-REINFORCED PLASTICS

FIELD OF THE INVENTION

The present invention relates to a torque transmitting shaft (hereinafter referred to as a drive shaft) made of fiber reinforced plastics (hereinafter abbreviated as FRP). More particularly, it relates to a drive shaft having high torque transmissibility suitable for use in automobiles, ships, and helicopters. The present invention also relates to a method for connecting an FRP-made pipe and a fitting part.

BACKGROUND OF THE INVENTION

Drive shafts for vehicles, ships, etc. are generally composed of a metallic solid rod or hollow pipe having connected to both ends thereof a metallic fitting or joint element. With the recent demand for automobiles of reduced weight, not only replacement of metallic materials of automobile body with FRP but weight reduction of structural elements have been attracting attention. In particular, because a drive shaft is a revolving part, replacement of the material therefor with FRP is expected to make a great contribution to total weight reduction and has aroused considerable attention. That is, a drive shaft made of FRP has a weight reduced to a half to a quarter of that of the conventional steel-made one and has been extending its use in various automobiles.

In pursuit of comfortableness of ships, use of FRP-made drive shafts has been expected to deviate a resonant frequency from the service range. This is because FRP can make its resonant frequency either high or low while maintaining the torsional strength based on the fact that FRP is superior to metals, e.g., steel and aluminum, in specific strength (strength/density) and specific rigidity (modulus of elasticity/density) and that flexural rigidity or torsional rigidity of FRP can arbitrarily be controlled by changing the angle of orientation of fibers.

FRP-made drive shafts are generally produced by integrally molding a pipe made of FRP around the joint area of a fitting by filament winding or tape winding or by connecting a separately prepared hollow FRP pipe with a fitting by any means, for example, with an adhesive. However, the joint strength attained by the known method of connection is insufficient for transmission of high torsional torque or undergoes reduction with time. It is also known to shape the connecting portion into a regular polygon, but such shaping requires much labor in working, resulting in low productivity.

Other various means for transmission of high torsional torque has been proposed. For example, it has been suggested to engage a fitting with a pipe made of FRP (hereinafter referred to as an FRP pipe) both having serrations on the connecting portion thereof, or to fit a fitting having serrations on the connecting portion thereof into an FRP pipe to bite the inner wall of the FRP pipe as disclosed in JP-A-U-53-9378, JP-A-U-54-97541, JP-A-55-159311, JP-A-54-132039, and JP-B-62-53373 (the term "JP-A-U" as used herein means an "unexamined published Japanese utility model application"; the term "JP-A" as used herein means an "unexamined published Japanese patent application"; and the term "JP-B" as used herein means an "examined published Japanese patent application").

However, the former means encounters with a difficulty in forming serrations on the inner wall of an FRP pipe upon its molding. If serrations are formed by mechanical processing after molding the FRP pipe, the reinforcing fiber is cut to reduce the strength at the connecting portion, resulting in a failure to transmit a high torsional torque.

The same problem also arises in the latter means. That is, the reinforcing fiber at the connecting portion is apt to be cut by the serrations of the fitting, resulting in a failure to transmit a high torsional torque.

In an attempt to achieve reliable connection, it has been proposed to cover the joint with a metallic outer ring for reinforcement, but such diminishes the effect of weight reduction as purposed.

SUMMARY OF THE INVENTION

An object of the present invention is to resolve the above-described problems associated with FRP drive shafts having a serrated joint and to provide an FRP drive shaft which has high torque tansmissibility and which can be produced without involving complicated working.

The present invention relates to a drive shaft made of FRP comprising an FRP pipe to which a fitting is connected, in which a connecting portion of the FRP pipe and a connecting portion of the fitting engage each other through bite of serrations formed on the inner or outer surface of the connecting portion of the fitting into the connecting portion of the FRP pipe, with the space between the pipe and the fitting at the biting sites being filled with an adhesive.

In a preferred embodiment of the drive shaft made of FRP of the present invention as described above, the FRP pipe has provided, on the side into which the serrations of the fitting bite, a protective layer having a circumferential modulus of elasticity of not more than 30 GPa at the connecting portion thereof, so that the bite of the serrations is via said protective layer.

In another preferred embodiment of the drive shaft made of FRP of the present invention as described above, the FRP pipe has provided a reinforcing layer as an outer, inner or intermediate layer on the connecting portion thereof, the ratio of the thickness of the thus reinforced connecting portion (tj) to the thickness of the pipe (tp), tj/tp, being not more than 3.

The present invention also relates to a method for connecting an FRP pipe with a fitting, the method comprising the steps of:

applying an adhesive to at least one of a connecting portion of the pipe and a connecting portion of the fitting; and press-fitting the fitting into the pipe or press-fitting the pipe into the fitting, the pipe having no serration at the connecting portion thereof, and the fitting having serrations on the outer or inner surface thereof at the connecting portion thereof.

In a preferred embodiment of the method of the present invention as described above, the FRP pipe has provided on the side into which the serrations of the fitting bite, a protective group having a circumferential modulus of elasticity of not more than 30 GPa at the connecting portion thereof, so that the bite of the serrations is via the protective layer.

In another preferred embodiment of the method of the present invention as described above, the fitting is a joint element of a drive shaft.

DETAILED DESCRIPTION OF THE INVENTION

Figure 1:
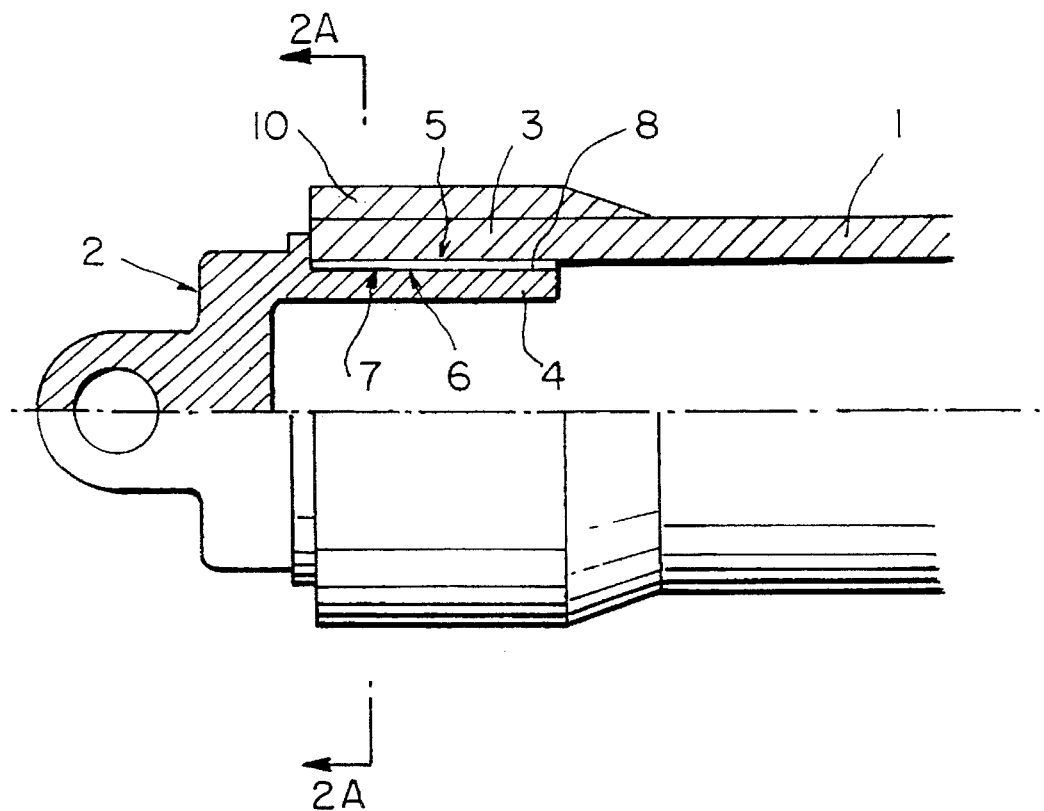
FIG. 1 illustrates a partial longitudinal section of one embodiment of the FRP drive shaft according to the present invention including reinforcing layer 10.
Figure 2A:
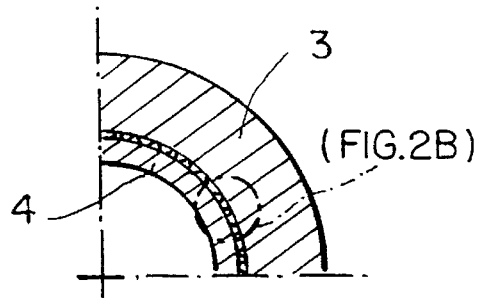
FIGS. 2-A and 2-B illustrate partial transverse sections of the FRP drive shaft of FIG. 1 along line 2A—2A.
Figure 2B:
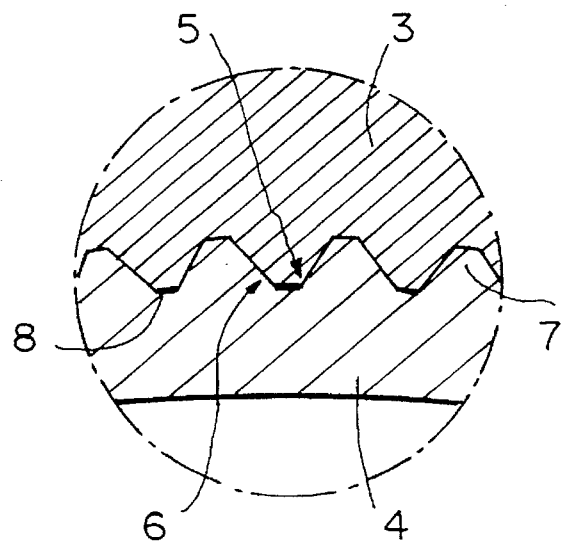

A partial longitudinal section of one embodiment of the FRP drive shaft according to the present invention is shown in FIG. 1, and a partial transverse section at line 2A—2A of the drive shaft of FIG. 1 is shown in FIGS. 2-A and 2-B.

FRP pipe 1 is prepared by a known process, for example filament winding, tape winding or a rolling table method. Fitting 2 previously has it connecting area 6 serrated. No serration is provided on connecting area 5 of FRP pipe 1. The inner diameter of connection portion 3 of FRP pipe 1 is made slightly smaller than the outermost diameter of connection portion 4 of fitting 2 (inclusive of the top of the serrations) so that teeth 7 of the serrations on connecting area 6 of fitting 2 may bite into connecting area 5 of FRP pipe 1 when connecting portion 4 of fitting 2 is press-fit (inserted under pressure) into connecting portion 3 of FRP pipe 1 with an applied load. Adhesive 8 fills the space formed at the joint surface between connecting area 5 of FRP pipe 1 and connecting area 6 of fitting 2 thereby to enhance the adhesion and to prevent penetration of water into the space. As a result, the torsional torque transmission performance, corrosion resistance, environmental resistance, and durability are improved.

The manner of filling the space with an adhesive is not particularly restricted. For example, it is preferred to apply an adhesive to connecting area 5 of FRP pipe 1 and/or serrated surface 6 of fitting 2 before press-fitting. In this case, the applied adhesive also functions as a lubricant in press-fitting to reduce the load for fitting and also to prevent serration teeth 7 from damaging connecting area 5 of FRP pipe 1. Alternatively, an adhesive may be applied to the space in the engaging part after press-fitting.

Figure 3:
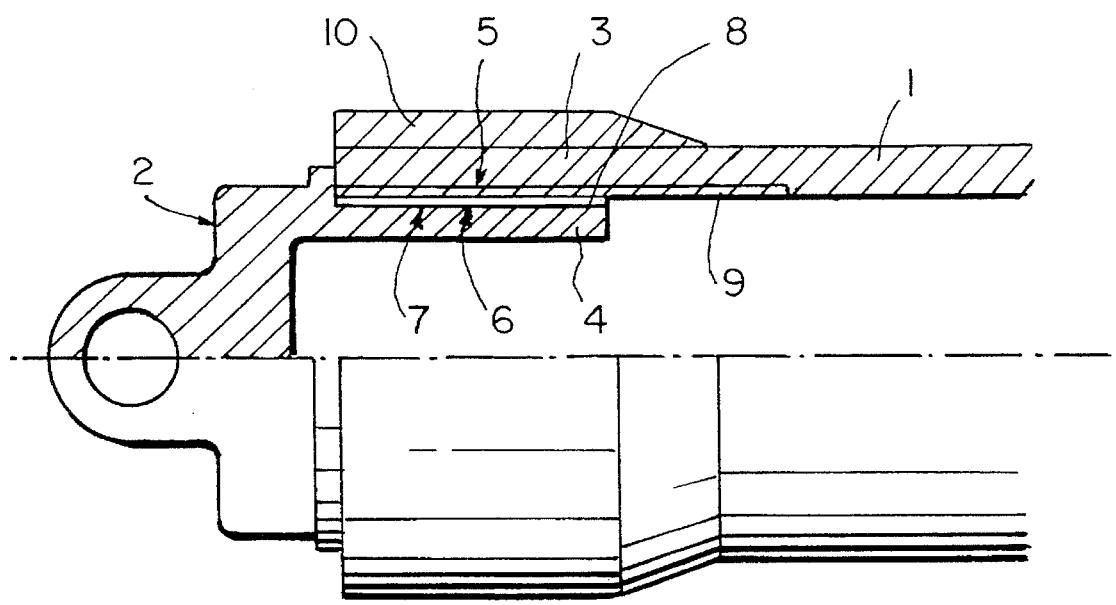
FIG. 3 illustrates a partial longitudinal section of another embodiment of the FRP drive shaft according to the present invention including reinforcing layer 10.

In a preferred embodiment of the present invention, protective layer 9 is provided on connecting area 5 of FRP pipe 1 as shown in FIG. 3 so that serration teeth 7 may bite into connecting area 5 of FRP pipe via the protective layer. In this embodiment, the protective layer further ensures firm connection and, at the same time, prevents the teeth of the serrations from directly damaging the portion of the FRP pipe which is burdened with the substantial load of the pipe.

For the purpose of increasing the resonant frequency of a drive shaft during revolution, the reinforcing fiber materials which can be used in the present invention preferably have high modulus of elasticity and high strength. Fibers having high specific strength and high specific rigidity are preferred for producing an appreciable effect on weight reduction. Examples of such fibers include carbon fibers, glass fibers, aramid fibers, and ceramic fibers. These fibers may be used either individually or in combination of two or more thereof. Among them, carbon fibers are especially preferred. A combined use of carbon fibers and glass fibers is also favorable from the standpoint of strength and economy.

The form of the fiber is not particularly limited and may be roving, woven fabric, prepregs, etc. The angle of fiber orientation preferably ranges from ±30° to ±90° with respect to the axial direction of the shaft for achieving transmission of a high torsional torque, and from 0° to ±30° for aiming at an increased resonant frequency. The optimum angle of fiber orientation can be decided according to characteristics required.

Matrix resins of FRP are not particularly limited. Examples of the matrix resins include thermosetting resins, such as epoxy resins, unsaturated polyester resins, vinyl ester resins, urethane resins, phenolic resins, alkyd resins, imide resins, bismaleimide resins, xylene resins, melamine resins, furan resins, and silicone resins; and thermoplastic resins, such as polyethylene resins, polypropylene resins, polyvinyl chloride resins, polymethyl methacrylate resins, ABS resins, fluorine-containing resins, polycarbonate resins, polyester resins, polyamide resins (e.g., NYLON 6, NYLON 6.6, NYLON 6.10, NYLON 6.11, and NYLON 6.12), polyphenylene sulfide resins, polysulfone resins, polyether sulfone resins, polyether ether ketone resins, and polyphenylene oxide resins. Preferred of them include epoxy resins, unsaturated polyester resins, and vinyl ester resins in view of their easy handling and excellent physical properties. These resins may be used either individually or in combination of two or more thereof.

The fiber content of the FRP pipe ranges usually from 40 to 75% by volume, and preferably from 50 to 70% by volume. If the fiber content is less than 40%, the reinforcing effect tends to be insufficient that the pipe must have an increased wall thickness, which reduces the effect of weight reduction. If the fiber content exceeds 75%, probability of contact among fibers may become high thereby reducing torsional strength.

The molding method for producing an FRP pipe which can be used in the present invention is not particularly restricted, and any known method may be applied. Filament winding, tape winding or a rolling table method is preferred from the standpoint of molding efficiency and performance properties of the resulting pipe.

The fitting which can be used in the present invention is preferably made of metals in view of excellent mechanical properties and easy processing. From the standpoint of strength and rigidity, iron, aluminum, titanium, magnesium, and alloys comprising such a metal as a main component are particularly preferred.

The terminology "serrations" or "serration" as used herein is a generic term of long and narrow projections (or grooves) formed on the connecting portion of a fitting extending substantially along the axis of the fitting. In JIS and other industrial standards, "serration" is generally discriminated from "spline" according to the angle of the top of the projection and from "knurl" according to the technique for formation of productions in such a manner that projections made by cutting with a blade using a hobbing machine are called "serration", whereas those made by transferring the tooth form of a jig onto an objective material by rolling are called "knurl" or "roulette". The term "serrations" or "serration" of the present invention is construed as including "spline", "knurl" and "roulette".

Figure 4A:
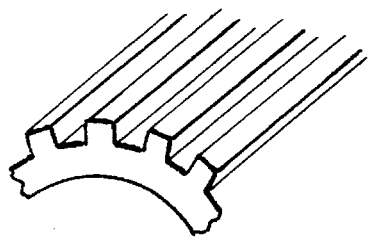
FIGS. 4-A and 4-B illustrate examples of the serrations used in the present invention.
Figure 4B:
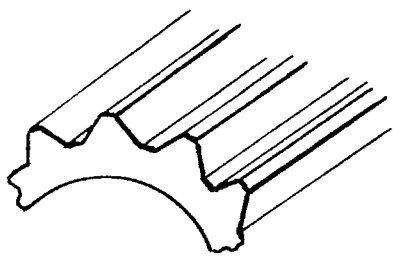

The shape of the serrations (the shape of projections in the radial direction) of the present invention is not particularly limited, and preferred examples of sections of the serrations include a triangle, a rectangle, and a trapezoid as shown in FIGS. 4-A and 4-B, for example. Strong connection can be obtained by using the serrations.

The height of the tooth of the serrations (h in FIG. 5) is generally selected from 0.005 to 10 mm, preferably from 0.05 to 3.0 mm, though varying depending on the demanded torque, the inner diameter of an FRP pipe, and the material or thickness of the film used. If it is less than 0.005 mm, bite into a film layer on an FRP pipe tends to be insufficient resulting in reduction of transmissibility of torsion. If it exceeds 10 mm, the number of the teeth decreases, and the torsional torque borne by each tooth so increases that the inner layer of the FRP pipe is apt to be broken.

The pitch of the tooth of the serrations (p in FIG. 5) is generally selected from 0.05 to 10 mm, and preferably from 0.1 to 5.0 mm, though varying depending on the demanded torque to be transmitted, the diameters of a fitting and an FRP pipe, and the material or thickness of a protective layer if provided.

The tooth of the serrations are preferably parallel with the longitudinal axis of a fitting but may form an angle of up to 15° with the fitting axis.

Where a fitting is inserted into an FRP pipe, the outer diameter (df) of a fitting at the connecting portion inclusive of the tooth top of the serrations is made slightly greater than the inner diameter (dp) of an FRP pipe (inclusive of a protective layer if provided).

An optimum df/dp ratio is not particularly limited because it is subject to variation according to the required torque transmitting power, the inner diameter and wall thickness of an FRP pipe, the material and thickness of a protective layer if provided, and the shape and dimension of serrations. It is selected appropriately from such a range in which a high torque transmitting power can be achieved without cutting a protective layer or damaging the FRP pipe when a fitting is press-fitted into the FRP pipe. The df/dp ratio is usually selected from 1.0002 to 1.020, preferably from 1.001 to 1.010, while not limiting.

For example, with the inner diameter of an FRP pipe being 70 mm, if the df/dp ratio is about 1.028, great pressure would be required for press-fitting, causing great strain to the inner wall of the FRP pipe, which leads to breakage at the connecting portion at a low torque. If the df/dp ratio is smaller than 1.0002, press-fitting can be performed with relative ease, but the bite of the serrations into the FRP pipe tends to be insufficient, hardly producing sufficient power for holding torsional torque, resulting in low torque transmissibility.

The tip end of the connecting portion of a fitting is preferably tapered so as to have a smaller outer diameter than the inner diameter of the connecting portion of an FRP pipe for smooth insertion into the FRP pipe. For example, the tapering angle at the tip of a fitting is preferably not more than 30°. Alternatively, it is possible that the inner diameter of the connecting portion of an FRP pipe may be gradually increased toward the end so that the end of the connecting portion of the FRP pipe may have a larger diameter than the outer diameter of a fitting to be inserted for smooth insertion.

The length of the connecting portion, though varying depending on the desired breaking torque, can be reduced by the use of an adhesive and preferably by providing a protective layer.

The length of the connecting portion is not partucularly limited and can be appropriately determined depending on the dimensions of the fitting and a joint length required for attaining the desired breaking torque. The term "joint length" means a length of the portion at which the connecting portion of the FRP pipe and the connecting portion of the fitting are overlapped each other after press-fitting. The joint length is preferably selected in such a manner that the ratio of the joint length to the inner diameter of the FRP pipe falls within the range of from 0.1 to 1.5. For example, in the case of the FRP pipe having an inner diameter of 70 mm, the joint length portion is preferably about from 10 to 100 mm.

Adhesives which can be used in the present invention are preferably liquid adhesives having a viscosity of from 50 to 10,000 poise at room temperature. The adhesive is applied to at least one of the connecting area of the serrations of a fitting and the connecting area of an FRP pipe either before or after press-fitting. If desired, the adhesive may be subjected to curing, for example, heat treatment, after connecting. By the use of the adhesive, firm connection can be achieved, and the torque transmissibility is improved. Further, the space left between the connecting area of the FRP pipe and the grooves of the fitting is filled with the adhesive to prevent water penetration thereby improving environmental resistance and durability. The adhesive, when applied before press-fitting, also serves as a lubricant in press-fitting thereby to reduce the load of insertion and also to prevent damage to the FRP pipe surface or a protective layer thereof. If the adhesive has a viscosity lower than 50 poise, it tends to run on press-fitting. If the viscosity is higher than 10,000 poise, the viscosity resistance becomes high, making it difficult to press-fit a fitting.

Adhesives to be used are not particularly limited and examples thereof include epoxy adhesives, urethane adhesives, cyano acrylate adhesives, modified acrylate adhesives, various rubber adhesives, polyester adhesives, polyimide adhesives, etc. Epoxy adhesives are preferred for their performance, environmental resistance, and ease of handling. Specific examples of the epoxy adhesives suitable adhesives include "EPOXY PATCH KIT®" (produced by Hysole Co., Ltd.), "TECHNODYNE HT18-X" (produced by Taoka Kagaku Kogyo K. K.), and "SONY BOND®" (produced by Sony Chemical Co., Ltd.).

The protective layer which can be used in a preferred embodiment of the present invention is a thin layer having a circumferential modulus of elasticity of not more than 30 GPa, and preferably of from 4 to 30 GPa, which is provided as the connecting area of the connection portion of an FRP pipe, i.e., on the surface of an FRP pipe where the serrations of a fitting bites. The protective layer is provided to protect the fibers of the FRP pipe from damage by direct attack of the tooth of serrations. If the circumferential modulus of elasticity of the protective layer is lower than 4 GPa, the protective layer tends to undergo elastic deformation by the revolving force, causing the tooth of serrations to slide even under low revolving force. If it exceeds 30 GPa, bite of serrations is insufficient, or the protective layer is damaged, resulting in difficulty in holding revolving force.

Examples of the material of the protective layer include FRP in the form of a layer. The protective layer is preferably integrally united with an FRP pipe. For example, where an FRP pipe is produced by the filament winding or tape winding method, a protective layer is previously laid around a mandrel for filament winding or tape winding for producing an FRP pipe, or a protective layer is adhered to the inner wall of a produced FRP pipe. The protective layer may be provided on only the connecting protion of an FRP pipe or in its vicinities or, for the sake of convenience of production, on the entire of the FRP pipe.

The FRP layer as a protective layer is a layer obtained by impregnating nonwoven or woven fabric of various reinforcing fibers with a matrix resin and curing the resin. Examples of the reinforcing fibers include inorganic fibers, such as glass fibers, carbon fibers, and alumina fibers, and organic fibers, such as aromatic polyamide fibers. Specific but non-limiting examples of the fiber-reinforced resin layer include a layer prepared by impregnating a so-called surfacing mat or overlay mat (a non-woven mat made, e.g., of glass fibers) with a matrix resin and a layer prepared by impregnating a so-called scrim cloth made, e.g., of glass fibers with a matrix resin.

Examples of the matrix resin which can be used in the protective layer includes those described above with respect to the molding of FRP pipes. In using a thermosetting resin as a matrix resin of the protective layer, it may be cured simultaneously with curing of the matrix resin of an FRP pipe.

It is preferred that the ratio of the circumferential modulus of elasticity (Ef) of the protective layer to that (Em) of a fitting, Ef/Em, is not more than about 0.2. With the Ef/Em ratio falling within this preferred range, bite of the serrations of a fitting into the protective layer easily occurs to obtain further improved torque transmitting performance.

The thickness of a protective layer (tf) and the height of the serrations (h in FIG. 5) are selected appropriately according to the required breaking torque, the size of a fitting or an FRP pipe, the material or thickness of a protective layer, and the like. It is preferred that the ratio of tf to h, tf/h, is from 0.5 to 5. If the tf/h ratio is less than 0.5, bite into a protective layer on an FRP pipe tends to be insufficient, resulting in reduction of torque transmissibility, or press-fitting of a fitting tends to cause breakage of the connecting portion of an FRP pipe. If it exceeds 5, molding properties of the protective layer material in, for example, winding around a mandrel, are reduced. Besides, sufficient bite of the serrations into an FRP pipe cannot be achieved, resulting in reduction in torque transmissibility, or an extraordinary load would be required for causing bite.

In order to ensure firm connection of a fitting with an FRP pipe and to surely transmit an applied torsional torque from a fitting to an FRP pipe, it is preferred to provide a reinforcing layer only on the connecting portion of an FRP pipe as an outer, inner or intermediate layer. Such a reinforcing layer facilitates bite of the serrations into the FRP pipe on press-fitting and guarantees maintenance of torsional torque. The higher the circumferential modulus of elasticity of the reinforcing layer, the greater the effects. Materials of the reinforcing layer are not particularly limited, and a reinforcing layer made of FRP or a metal may be used, for example.

From the viewpoint of weight reduction, reinforcement with an FRP reinforcing layer surpasses a metallic reinforcing tube. An FRP reinforcing layer can be integrally molded with an FRP pipe. Preferred fibers for use in the reinforcing FRP layer include the same as those enumerated above. In particular, carbon fibers are preferred from the standpoint of modulus of elasticity, and glass fiber is preferred from the standpoint of cost. The reinforcing fiber is wound at an angle of from ±60° to ±90° with respect to the axial direction of an FRP pipe. When wound at a winding angle smaller than ±60°, the reinforcing fiber tends to fail to suppress expansion of the FRP pipe on press-fitting of a fitting. As a result, the bite of the serrations is apt to be insufficient, and transmission of torsional torque would be insufficient.

The end of the reinforcing layer corresponding to the end of a press-fitted fitting (i.e., the end nearer to the center of the FRP pipe) is preferably tapered in such a manner that the thickness gently decreases towards the center of the FRP pipe at a slope of not more than 10°. The tapering of the reinforcing layer is not always necessary but is effective to alleviate stress concentration at the boundary between the straight portion of the FRP pipe and the tapered portion or the connection portion with torque applied. This portion may be reinforced by a metallic reinforcing tube.

The thickness of the reinforcing layer is preferably selected in such a manner that the ratio of the thickness of the connecting portion of an FRP shaft (tj) to the thickness of an FRP pipe (tp), i.e., tj/tp is not more than 3. If the tj/tp ratio exceeds 3, the reinforcing effect reaches saturation, rather resulting in disadvantages, such as increases in diameter of the joint and in weight.

Figure 6:
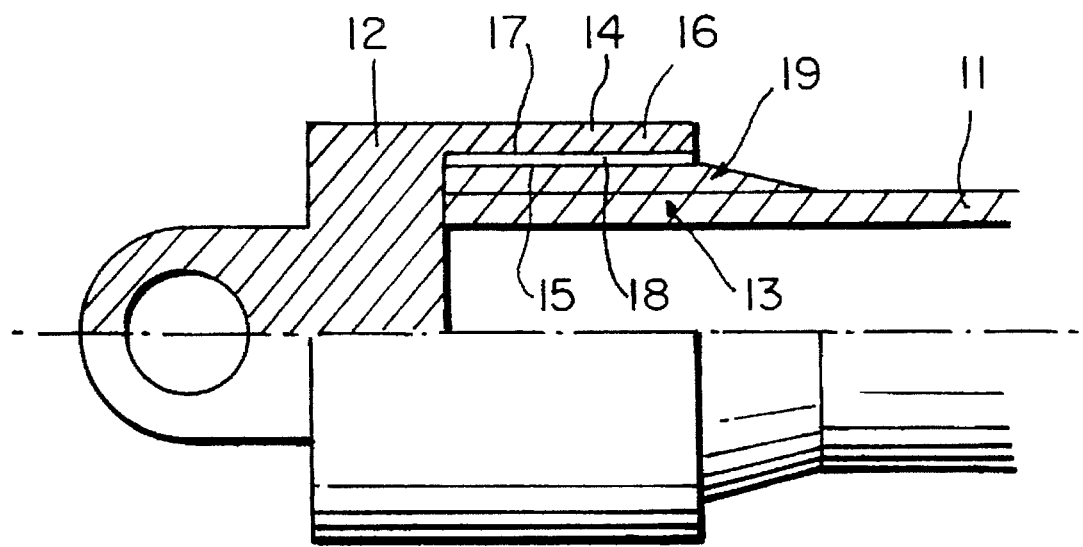
FIG. 6 illustrates a partial longitudinal section of another embodiment of the FRP drive shaft according to the present invention.

While the foregoing description chiefly relates to an embodiment in which a fitting having a serrated connecting portion on the outer periphery thereof is press-fitted into the inside of an FRP pipe with an adhesive being applied therebetween, the present invention also includes in its scope another embodiment in which a fitting having serrations on the inner side of the connecting portion thereof, and an FRP pipe is press-fitted into the inside of the fitting shown in FIG. 6.

Numeral 11 denotes an FRP pipe with a reinforcing layer 19 as an outer layer on connection portion 13. Fitting 12 previously has connecting area 16 serrated. No serration is provided on connecting area 15 of FRP plate 11. The outer diameter of connection portion 13 of FRP pipe 11 (outer diameter of reinforcing layer) is made slightly larger than the innermost diameter of connecting portion 14 of fitting 12 (inclusive of the top of the serrations) so that teeth 17 of the serrations on connecting area 16 of fitting 12 may bite into connecting area 15 of FRP pipe 11. Resin 18 fills the space formed at the joint surface between connecting area 15 FRP pipe 11 and connecting area 16 of fitting 12.

In carrying out the above-mentioned second embodiment where an FRP pipe is press-fitted in the inside of the fitting, the above-mentioned reinforcing layer can be provided on the inner periphery of the connecting portion of the FRP pipe so as to prevent deformation of the FRP pipe on press-fitting.

The above-described method for producing an FRP drive shaft is widely applicable to general connection of an FRP pipe to various fitting parts and makes a great contribution to broadening of application of FRP pipes. That is, according to the method of the present invention, firm connection between an FRP pipe and a pipe fitting part can easily be achieved under a reduced load by forming serrations on the outer or inner surface of the connecting portion of the fitting part and connecting the fitting with the FRP pipe by press-fitting with an adhesive being applied to the biting portion.

Fitting parts which can be connected to an FRP pipe according to the method of the present invention are not particularly limited. Examples of fitting parts include a part forming an end of an FRP roller; a part to be fitted to the end of an FRP pipe, e.g., a bearing; and various joint elements for connecting FRP pipes to each other or connecting an FRP pipe to other parts. Materials of these fittings to be connected are not particularly limited as long as firm serrations can be formed thereon. Examples of the materials include various metals, e.g., steel, various ceramic materials, e.g., alumina, and various high rigid resins. The shape and size of the serrations to be formed are selected appropriately according to the purpose sought and the dimension of the final product.

The present invention will now be illustrated in greater detail by way of Examples, in which a drive shaft is produced by connecting an FRP pipe to a metal yoke. While the characteristic effects of the present invention in exhibiting high torque transmissibility are fully manifested in the production of a drive shaft as in the following Examples, the present invention is not deemed to be limited thereto and can be applied to the wide range as mentioned above.

EXAMPLES 1 TO 7

Production of FRP Pipe

A stainless steel-made mandrel of 70.0 mm in outer diameter and 1,500 mm in length was mounted on a filament winding machine. In Examples 3, 6 and 7, a 50 mm long portion at both ends of a central 1,000 mm long portion of the mandrel was wrapped with a material of a protective layer shown in Table 1 below.

Glass fiber "T-30 ROVING R1150F08" (produced by Asahi Fiber Glass Co., Ltd) impregnated with a liquid epoxy resin composition comprising a bisphenol A type epoxy resin ("SUMIEPOXY ELA-128" produced by Sumitomo Chemical Co., Ltd.) and an aromatic amine curing agent ("TONOX 60/40" produced by Uniroyal Chemical Co., Inc.) was wound around the mandrel at a winding angle of ±85° to ±90° with respect to the axis of the mandrel to a thickness of 0.4 mm. In Examples 2 and 5, the glass fiber layer was omitted. Carbon fiber "MAGNAMITE AS-4" (general-purpose carbon fiber sold by Sumika Hercules Co., Ltd.; modulus of elasticity: 235,000 N/m$^2$ (24 tonf/mm$^2$); strength: 3,820 N/m$^2$ (390 kgf/mm$^2$) impregnated with the same liquid epoxy resin composition was further wound thereon at a winding angle of ±16° to a thickness of 2.85 mm. The total fiber content was adjusted to 60%±2% by volume.

Subsequently, the fiber shown in Table 1 was wound around the fiber layer at the portion corresponding to a connecting portion into which a fitting was to be fitted at a winding angle of ±85° to ±90° to a prescribed thickness to form a reinforcing layer (10 in FIG. 1). The winding end of the reinforcing layer was tapered at an angle of about 6°.

The mandrel was put in a curing furnace and heated to 150° C. for 2 hours while being revolved to cure the resin. After curing, the mandrel was drawn out, and the unnecessary portion at both ends of the pipe was cut off to obtain an FRP pipe (1 in FIG. 1) of 1,100 mm in length and 70.1 mm to 70.2 mm in inner diameter having a reinforcing layer at both ends thereof.

Production of Metal Yoke

Figure 5:
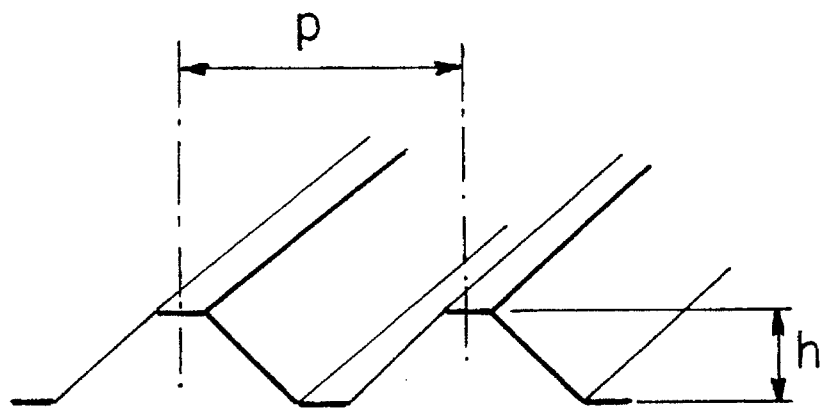
FIG. 5 illustrates the height (h) and pitch (p) of the serrations according to the present invention.

Parallel knurl (module: 0.3) specified in JIS B0951 (1962) was formed on the outer circumference of a connecting portion of a steel yoke. The thus formed serrations (knurl) had a section of a flat-topped isosceles triangle having a vertical angle of about 90° as shown in FIG. 5. The height and pitch of the serrations were about 0.2 mm and about 0.928 mm, respectively. The outer diameter of the connecting portion of the yoke inclusive of the top of the serrations was 70.4 mm to 70.5 mm. Therefore, the df/dp ratio was 1.002 to 1.006.

Production of FRP Drive Shaft and Evaluation

The serrated connecting portion of the yoke with an epoxy adhesive "TECHNODYNE HT-18X" (produced by Taoka Kagaku Kogyo K. K.; viscosity: 600 poise at room temperature) applied thereto was held to each end of the FRP pipe and press-fitted thereinto by a hydraulic pressure to a joint length (length of the portion at which the connecting portion of the FRP pipe and the connecting portion of the fitting were overlapped each other) of 20 mm. While the joint length was set at 20 mm for the sake of relative evaluation of torque transmissibility, it may be made longer according to the purpose in the industrial production of drive shafts so as to have a transmitted torque at the joint higher than the torsional breaking torque of the pipe.

The resulting FRP drive shaft was evaluated for torque transmissibility by a static torsion test. The results obtained are shown in Table 2.

COMPARATIVE EXAMPLES 1 TO 3

FRP drive shafts were produced in the same manner as in Examples 1 to 3, except that no adhesive was used in press-fitting. The results of static torsion test are shown in Table 2.

TABLE 1

| Example No. | Protective Layer | | | | | Reinforcing Layer | | | | Pressure for Fitting (KN) |
|---|---|---|---|---|---|---|---|---|---|---|
| | Material | Thickness tf (μm) | Modulus of Elasticity Ef (GPa) | Ef/Em Ratio | tf/h Ratio | Material | Thickness tj (mm) | tj/tp Ratio | Adhesive | |
| Example 1 | none | — | — | — | — | GF[1] | 3.0 | 1.92 | used | 28 |
| Example 2 | none* | — | — | — | — | GF | 3.0 | 2.05 | used | 27 |
| Example 3 | glass surfacing mat[2] | 200 ± 50 | 10 | 0.05 | 1.00 ± 0.25 | GF | 3.0 | 1.87 | used | 31 |
| Example 4 | none | — | — | — | — | CF[3] | 3.0 | 1.92 | used | 45 |
| Example 5 | none* | — | — | — | — | CF | 3.0 | 2.05 | used | 46 |
| Example 6 | glass scrim[4] | 200 ± 50 | 15 | 0.07 | 1.00 ± 0.25 | CF | 3.0 | 1.87 | used | 45 |
| Example 7 | glass surfacing mat | 200 ± 50 | 10 | 0.05 | 1.00 ± 0.25 | CF | 3.0 | 1.87 | used | 46 |
| Comparative Example 1 | none | — | — | — | — | GF | 3.0 | 1.92 | none | 38 |
| Comparative Example 2 | none* | — | — | — | — | GF | 3.0 | 2.05 | none | 24 |
| Comparative Example 3 | glass surfacing | 200 ± 50 | 10 | 0.05 | 1.00 ± 0.25 | GF | 3.0 | 1.87 | none | 41 |

TABLE 1-continued

| | | Protective Layer | | | | Reinforcing Layer | | | |
| --- | --- | --- | --- | --- | --- | --- | --- | --- | --- |
| Example No. | Material | Thickness tf (μm) | Modulus of Elasticity Ef (GPa) | Ef/Em Ratio | tf/h Ratio | Material | Thickness tj (mm) | tj/tp Ratio | Adhesive | Pressure for Fitting (KN) |
| | mat | | | | | | | | | |

Note:
*: In Examples 2 and 5 and Comparative Example 2, the innermost glass fiber layer (winding angle: ±85° to ±90°) was also not provided.
[1] Glass fiber
[2] "SM3600E" produced by Asahi Fiber Glass Co., Ltd.; basis weight: 30 g/m²
[3] Carbon fiber
[4] Electrically insulating cloth "WE 106 104" produced by Nitto Boseki Co., Ltd.; basis weight: 25 g/m²

TABLE 2

| Example No. | Breaking Torque (N · m) | Broken Portion |
| --- | --- | --- |
| Example 1 | 3,500 | joint area |
| Example 2 | 3,400 | joint area |
| Example 3 | 4,900 | joint area |
| Example 4 | 4,800 | joint area |
| Example 5 | 5,000 | joint area |
| Example 6 | >6,100 | FRP pipe |
| Example 7 | >6,100 | FRP pipe |
| Comparative Example 1 | 1,900 | joint area |
| Comparative Example 2 | 1,900 | joint area |
| Comparative Example 3 | 2,600 | joint area |

As described and demonstrated above, the FRP drive shafts according to the present invention exhibit higher torque transmissibility as compared with FRP drive shafts whose joint is made by mere bite of the serrations without using an adhesive. With no adhesive applied, a great load is required for press-fitting, and the resulting shaft is inferior in torque transmissibility as shown in Comparative Examples 1 to 3.

Since the FRP drive shafts of the present invention have strong adhesion between an FRP pipe and a fitting, they have higher torque transmissibility as compared with those shafts whose joint is made by mere frictional joining of cylindrical pipes, joining of cylindrical pipes with an adhesive applied, or joining of regular polygonal pipes.

Since the applied adhesive fills any gaps or spaces in the joint to prevent water penetration, the joint is hardly corroded and exhibits excellent durability and environmental resistance.

According to the method for producing an FRP drive shaft of the present invention, processing of the connecting part of an FRP pipe or a fitting is much easier than in using a regular polygonal joint, thus achieving extremely excellent productivity.

The drive shafts having a protective layer having a circumferential modulus of elasticity of not more than 30 GPa are further excellent in torque transmissibility. In particular, the drive shafts having a protective layer having a circumferential modulus of elasticity of not more than 30 GPa, with the Ef/Em ratio being not more than 0.2 and the tf/h ratio being not more than 5.0, and having a reinforcing layer having the tj/tp ratio being not more than 3, as in Examples 3, 6, and 7 are superior to those having no protective layer as in Examples 1, 2, 4, and 5.

The method of the present invention can be applied not only to the production of FRP drive shafts but to general connection of an FRP pipe with various pipe fitting parts. Therefor, the method is of high use for production of machinery and equipment where lightweight and high strength of FRP pipes can be made use of.

While the invention has been described in detail and with reference to specific examples thereof, it will be apparent to one skilled in the art that various changes and modifications can be made therein without departing from the spirit and scope thereof.

What is claimed is:

1. A drive shaft made of fiber-reinforced plastics comprising
   a pipe made of fiber-reinforced plastics having a connecting portion and a protective layer,
   said protective layer has a thickness and a circumferential modulus of elasticity of not more than 30 Gpa, is provided on the connecting portion,
   a fitting having a connecting portion with serrations having a height formed on one of the inner and outer surfaces of the connecting portion, the fitting has a circumferential modulus of elasticity,
   the serrations fittingly engage the protective layer of the pipe so that there are spaces between the serrations and the protective layer,
   an adhesive fills the space between the serrations and the protective layer.

2. A drive shaft as claimed in claim 1, wherein said protective layer has a circumferential modulus of elasticity of from 4 to 30 GPa, and wherein said protective layer is a resin.

3. A drive shaft as claimed in claim 1, wherein the ratio of the circumferential modulus of elasticity of said protective layer has a circumferential modulus of elasticity of said fitting is not more than about 0.2.

4. A drive shaft as claimed in claim 1, wherein the ratio of the thickness of said protective layer to the height of said serrations is from 0.5 to 5.

5. A drive shaft as claimed in claim 1, wherein a reinforcing layer is provided on the connecting portions of said pipe as an outer, inner, or intermediate layer, wherein the ratio of the thickness of said reinforced connecting portion to the thickness of said pipe is not more than 3.

6. A drive shaft as claimed in claim 1 wherein said adhesive is a an epoxy adhesive.

7. A method for connecting a pipe made of fiber-reinforced plastics with a fitting, said method comprising the steps of:

applying an adhesive to at least one of a connecting portion of said pipe and a connecting portion of said fitting; and press-fitting said fitting into said pipe or press-fitting said pipe into said fitting, said fitting having serrations on the outer or inner surface thereof at said connecting portion thereof;

wherein said pipe has a protective layer provided on the side of said pipe into which said serrations fit, wherein said serrations have a height, and wherein said protective layer has a thickness and a circumferential modulus of elasticity of not more than 30 Gpa at the connecting portion thereof, and wherein said fitting has a circumferential modulus of elasticity.

8. A method as claimed in claim 7, wherein said protective layer has a circumferential modulus of elasticity of from 4 to 30 GPa.

9. A method as claimed in claim 7, wherein the ratio of the circumferential modulus of elasticity of said protective layer to the circumferential modulus of elasticity of said fitting is not more than about 0.2, and the ratio of the thickness of said protective layer and the height of said serrations is from 0.5 to 5.

10. A method as claimed in claim 7, wherein said adhesive has a viscosity of from 50 to 10,000 poise at room temperature.

11. A method as claimed in claim 7, wherein said fitting is a joint element of a drive shaft.

* * * * *